United States Patent
Ohbitsu

(10) Patent No.: US 9,959,454 B2
(45) Date of Patent: May 1, 2018

(54) FACE RECOGNITION DEVICE, FACE RECOGNITION METHOD, AND COMPUTER-READABLE RECORDING MEDIUM

(71) Applicant: FUJITSU LIMITED, Kawasaki-shi, Kanagawa (JP)

(72) Inventor: Toshiro Ohbitsu, Akishima (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/407,239

(22) Filed: Jan. 16, 2017

(65) Prior Publication Data
US 2017/0124383 A1    May 4, 2017

Related U.S. Application Data

(63) Continuation of application No. PCT/JP2014/069622, filed on Jul. 24, 2014.

(51) Int. Cl.
G06K 9/00 (2006.01)
G06T 7/73 (2017.01)
H04N 5/232 (2006.01)

(52) U.S. Cl.
CPC ..... *G06K 9/00268* (2013.01); *G06K 9/00255* (2013.01); *G06K 9/00288* (2013.01);
(Continued)

(58) Field of Classification Search
CPC ....... G06K 9/00221–9/00315; H04N 5/23293; G06T 7/74; G06T 2207/30201
See application file for complete search history.

(56) References Cited

U.S. PATENT DOCUMENTS

| 8,300,950 B2* | 10/2012 | Ito ...................... G06K 9/00248 382/201 |
| 8,401,253 B2* | 3/2013 | Yamada ............. G06K 9/00248 382/118 |

(Continued)

FOREIGN PATENT DOCUMENTS

| JP | 2003-67339 | 3/2003 |
| JP | 2005-316888 | 11/2005 |

(Continued)

OTHER PUBLICATIONS

International Search Report and Written Opinion dated Oct. 7, 2014 in application No. PCT/JP2014/069622.

(Continued)

*Primary Examiner* — Aaron W Carter
(74) *Attorney, Agent, or Firm* — Maschoff Brennan

(57) ABSTRACT

A face recognition device includes a processor configured to: extract a plurality of feature points of a face included in an input image; detect a first and a second feature points that are paired from among the plurality of the feature points, a third feature point that is away from a straight line that connects the first and the second feature points, and two inter-feature vectors starting from the third feature point to the respective first the second feature points; calculate a feature angle formed by the two detected inter-feature vectors; and perform face recognition based on the feature angle formed by the two inter-feature vectors included in face information that is previously set as the face targeted for recognition and based on the calculated feature angle.

4 Claims, 13 Drawing Sheets

(52) U.S. Cl.
CPC ........... *G06T 7/74* (2017.01); *H04N 5/23293* (2013.01); *G06T 2207/30201* (2013.01)

(56) References Cited

U.S. PATENT DOCUMENTS

| | | | |
|---|---|---|---|
| 2002/0150280 A1* | 10/2002 | Li | G06K 9/00228 382/117 |
| 2007/0046662 A1* | 3/2007 | Kawakami | G06K 9/00275 345/419 |
| 2007/0071289 A1* | 3/2007 | Takeguchi | G06K 9/00281 382/118 |
| 2008/0126426 A1* | 5/2008 | Manas | G06Q 10/10 |
| 2009/0060290 A1 | 3/2009 | Sabe et al. | |
| 2011/0123118 A1* | 5/2011 | Nayar | G06T 11/60 382/190 |
| 2013/0142426 A1 | 6/2013 | Kaneda et al. | |
| 2013/0259324 A1* | 10/2013 | Huang | G06K 9/00281 382/118 |
| 2013/0322770 A1* | 12/2013 | Kaneda | G06K 9/00281 382/201 |
| 2015/0043790 A1* | 2/2015 | Ono | G06K 9/00288 382/118 |
| 2017/0124383 A1* | 5/2017 | Ohbitsu | G06K 9/00268 |

FOREIGN PATENT DOCUMENTS

| | | |
|---|---|---|
| JP | 2007-058401 | 3/2007 |
| JP | 2007-219899 | 8/2007 |
| JP | 2009-053916 | 3/2009 |
| JP | 2009-258991 | 11/2009 |
| JP | 2013-015891 | 1/2013 |
| JP | 2013-117794 | 6/2013 |

OTHER PUBLICATIONS

JPOA,,Office Action of Japanese Patent Application No. 2016-535592 dated Nov. 14, 2017, with machine translation.

* cited by examiner

FIG.7

| USER NO. | USER ID | PASS WORD | FRONT DATA | LEFT SURFACE DATA | RIGHT SURFACE DATA | UPWARD FACING DATA | DOWNWARD FACING DATA |
|---|---|---|---|---|---|---|---|
| 001 | ab@ab.com | ABCDX | AA<br>AB, BA | BB<br>BBB | CC<br>CCC | DD<br>DDD | XX<br>XXX |
| 002 | ef@ef.com | EFGHY | EE<br>EA, AE | FF<br>FFF | GG<br>GGG | HH<br>HHH | YY<br>YYY |
| 003 | ig@ig.com | IJKLZ | II<br>IA, AI | JJ<br>JJJ | KK<br>KKK | LL<br>LLL | ZZ<br>ZZZ |

D1

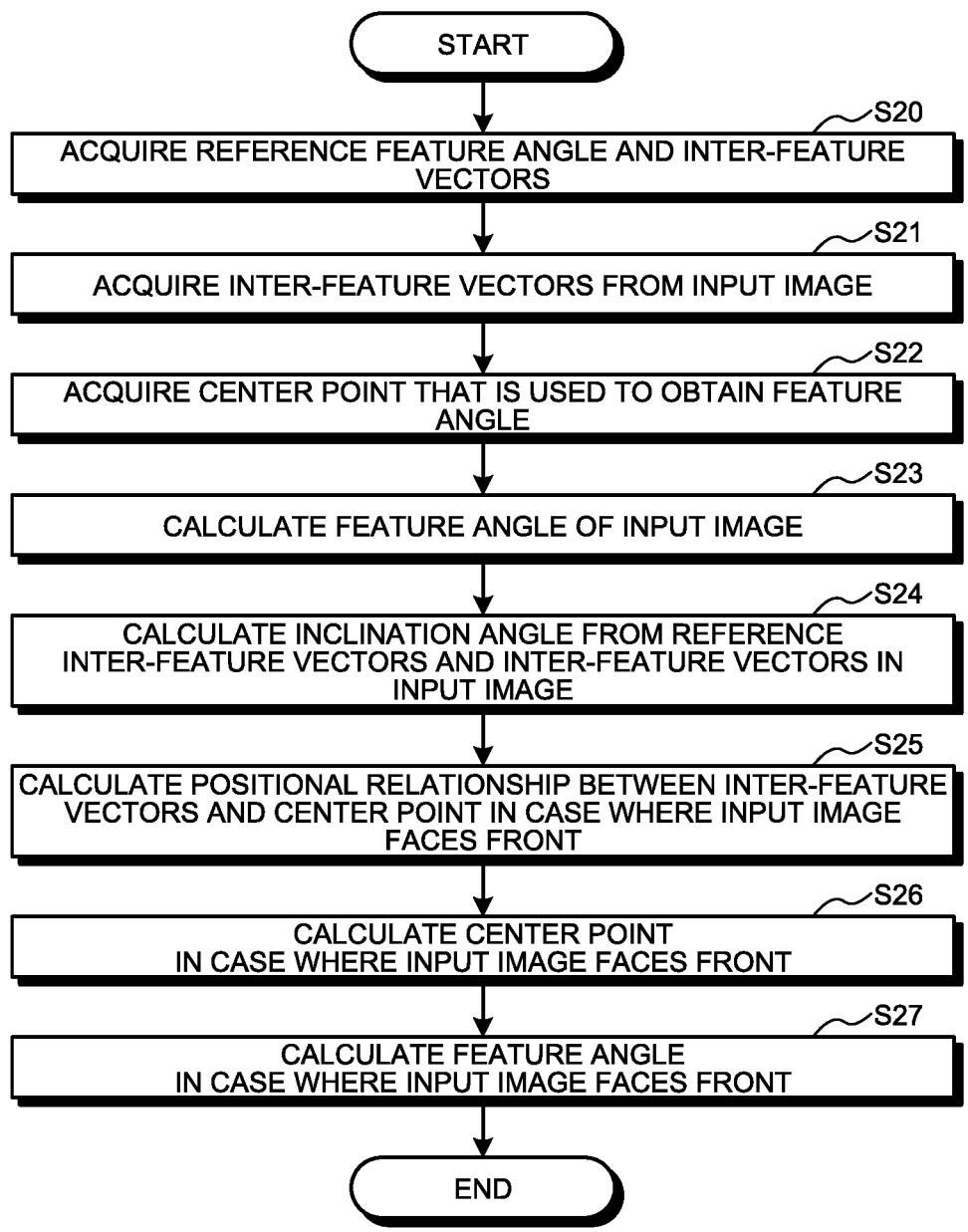

FACE RECOGNITION DEVICE, FACE RECOGNITION METHOD, AND COMPUTER-READABLE RECORDING MEDIUM

CROSS-REFERENCE TO RELATED APPLICATION

This application is a continuation application of International Application No. PCT/JP2014/069622, filed on Jul. 24, 2014 and designating the U.S., the entire contents of which are incorporated herein by reference.

FIELD

The embodiments discussed herein are related to a face recognition device, a face recognition method, and a computer-readable recording medium.

BACKGROUND

There are terminal devices, such as personal computers, tablet-type mobile terminals, or the like, and servers that recognize face information obtained from input images by cameras, that check the recognized face information against face information on a subject person that is previously stored in the terminal device or the server, and that perform recognition on the subject person (hereinafter, referred to as face recognition). The terminal devices or the servers perform, by recognizing the subject person from the face recognition, login authentication of the terminal devices or permission to use services through Web browsers or the like using the servers.

The face recognition specifies the distinctive portion, such as the eye, the nose, the mouth, a mole (lentigo), or the like, of the face on the input image (hereinafter, referred to as a feature point); judges the position of the portion with respect to the subject feature point or the distance between the feature points (hereinafter, referred to as the distance between the feature points), the position, the size, or the color of each of the portions with respect to the face; and checks the judged portion against the previously stored face information on the subject person.

Patent Document 1: Japanese Laid-open Patent Publication No. 2007-219899
Patent Document 2: Japanese Laid-open Patent Publication No. 2013-117794

By the way, in front of the camera, the face is not always facing the front and the face may sometimes faces sideways or upward. Thus, the orientation of the face on an input image is not always the same. Consequently, when periodically checking, by using the face recognition, a person who uses a terminal device or a server after the login authentication has been performed or a user of the service after the use permission has been given, there is a need to perform the face recognition based on the face not only the face facing to the front but also the face facing upward, downward, to the left, or to the right.

However, in the technology described above, if the orientation of the face of the subject person previously stored in the face information is different from the orientation of the face of the input image, because the position of the feature point and the distance between the feature points greatly vary depending on the orientation of the face, there is sometimes a case of not recognizing the subject person. For example, if the orientation of the face of the subject person previously stored in the face information is the orientation facing the front, it is not possible to accurately perform the face recognition based on the face facing upward, downward, to the left, or to the right.

Accordingly, it is an object in one aspect of an embodiment of the invention to provide face recognition even if a face is inclined.

SUMMARY

According to an aspect of the embodiments, a face recognition device includes a processor configured to: extract a plurality of feature points of a face included in an input image; detect a first and a second feature points that are paired from among the plurality of the feature points, a third feature point that is away from a straight line that connects the first and the second feature points, and two inter-feature vectors starting from the third feature point to the respective first the second feature points; calculate a feature angle formed by the two detected inter-feature vectors; and perform face recognition based on the feature angle formed by the two inter-feature vectors included in face information that is previously set as the face targeted for recognition and based on the calculated feature angle.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a schematic diagram illustrating ID management;

FIG. 9 is a flowchart illustrating a calculation process;

DESCRIPTION OF EMBODIMENTS

Figure 1:
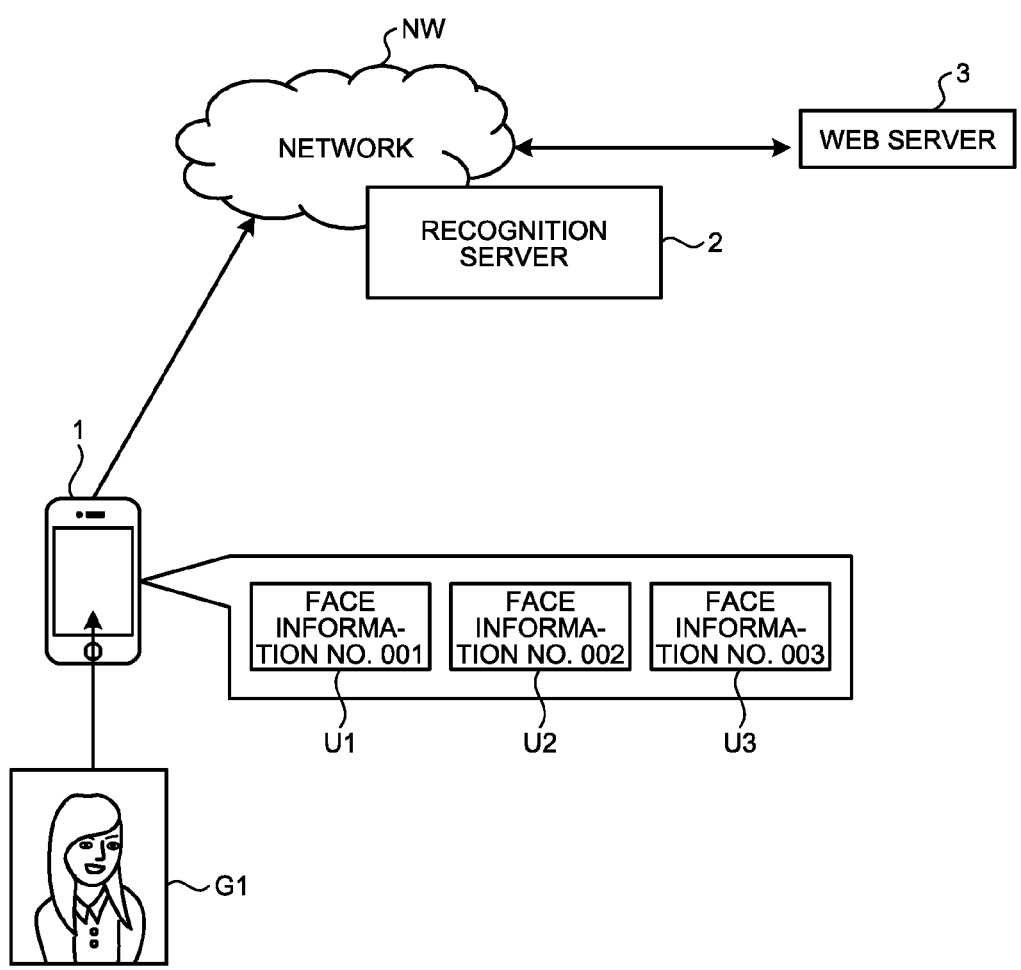
FIG. 1 is a schematic diagram illustrating the system configuration according to a first embodiment.

Preferred embodiments will be explained with reference to accompanying drawings. In the embodiments described below, components having the same function are assigned the same reference numerals and descriptions of overlapped portions will be omitted. Furthermore, the face recognition device, the face recognition method, and the face recognition program described in the embodiments below are only examples and are not limited to the embodiment. Furthermore, The embodiments may also be appropriately used in combination as long as processes do not conflict with each other.

[a] First Embodiment

FIG. 1 is a schematic diagram illustrating the system configuration according to a first embodiment. As illustrated in FIG. 1, a terminal device 1 is a device, such as a personal computer, a tablet-type mobile terminal, or the like, and is connected, via a communication network NW, such as the Internet or the like, to an external apparatus, such as a recognition server 2, a Web server 3, or the like, such that the terminal device 1 can perform communication with the recognition server 2, the Web server 3, or the like.

The terminal device 1 stores therein, for each user, face information U1, U2, and U3 used for face recognition. The terminal device 1 performs face recognition by checking the face in an input image G1 that is obtained by a digital camera provided on the upper portion of, for example, a display screen against the previously stored face information U1, U2, and U3 and permits a use with respect the recognized user. Thus, the terminal device 1 can prevent the user who is not set in the face information U1, U2, and U3 as the normal user from using the terminal device 1 and thus improve the security.

The recognition server 2 performs logon recognition with respect to various kinds of services provided by the Web server 3 or the like in accordance with a request from the terminal device 1 operated by a recognized user by the face recognition. The Web server 3 provides a Web service that allows the terminal device 1 subjected to the logon recognition performed by the recognition server 2 to browse a predetermined Web page. Furthermore, the Web server 3 may also be a server device that provides a social network service (SNS), a moving image chat service, a service that sends an image or a moving image to a counterpart terminal via the communication network NW.

Figure 2:
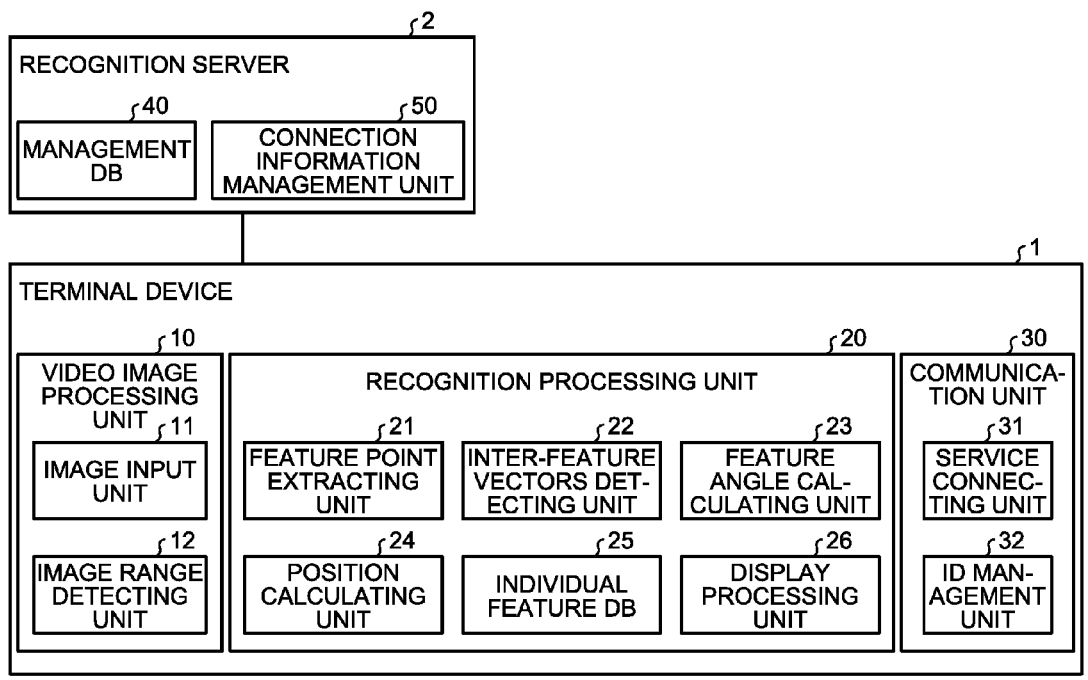
FIG. 2 is a block diagram illustrating the configuration of a terminal device and a recognition server according to the first embodiment.

FIG. 2 is a block diagram illustrating the configuration of the terminal device 1 and a recognition server 2 according to the first embodiment. As illustrated in FIG. 2, the terminal device 1 includes a video image processing unit 10, a recognition processing unit 20, and a communication unit 30.

The video image processing unit 10 is a processing unit that performs image processing related to various kinds of video images and performs the image processing on an input image G1 that is obtained by being captured by, for example, a digital camera provided in the terminal device 1. Specifically, the video image processing unit 10 includes an image input unit 11 and an image range detecting unit 12.

The image input unit 11 receives an input of the input image G1 captured by the digital camera provided in the terminal device 1. The image range detecting unit 12 recognizes the face included in the input image G1 received by the image input unit 11 and detects the image range of the recognized face. The image range detecting unit 12 outputs, to the recognition processing unit 20, the image data on the image range of the face detected by the input image G1. Furthermore, it is assumed that the recognition of the face included in the input image G1 is performed by using a known technology that recognizes a skin color area having the face shape by using, in combination, shape recognition obtained from outline extraction, color recognition, or the like.

Figure 3:
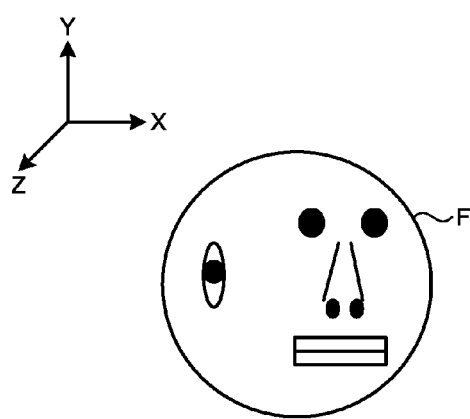
FIG. 3 is a schematic diagram illustrating the orientation of the face.

FIG. 3 is a schematic diagram illustrating the orientation of a face F. As illustrated in FIG. 3, the orientation of the face F included in the input image G1 is not limited to always facing the front but is sometimes inclined rotating about the X, Y, and Z-axes. Specifically, as the example illustrated in FIG. 3, the face F sometimes faces to the left by rotating the face F about the Y-axis.

Figure 4:
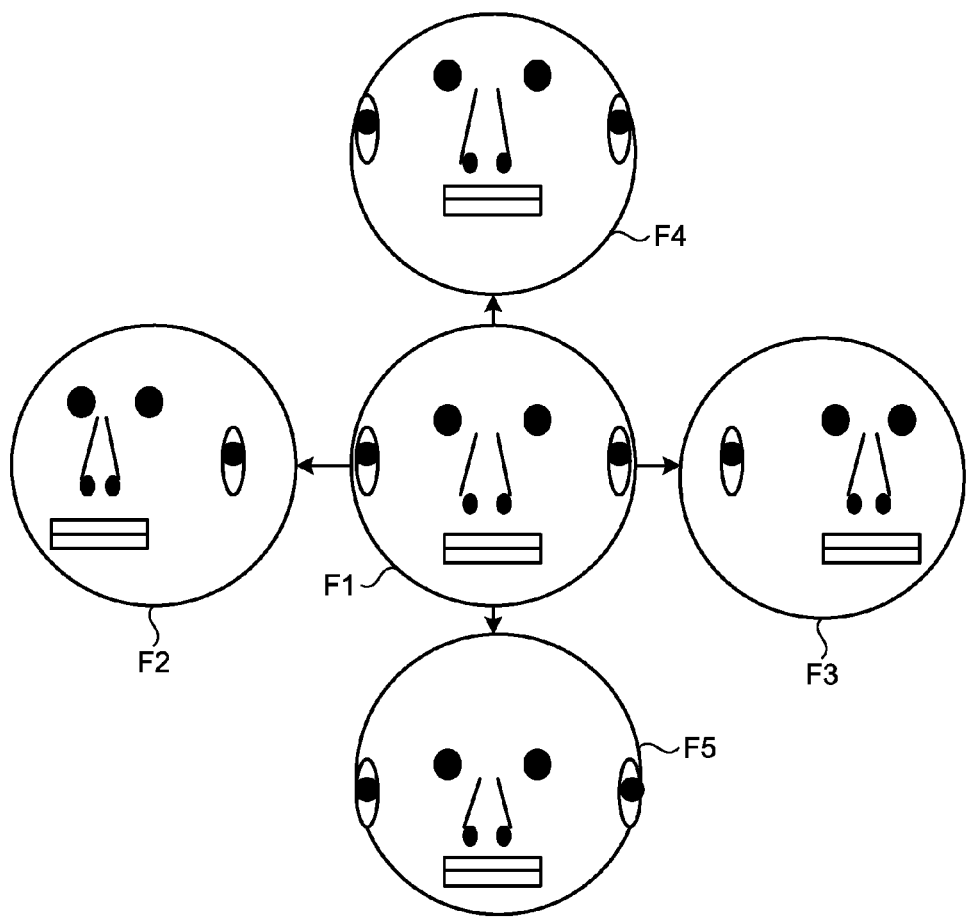
FIG. 4 is a schematic diagram illustrating the inclination of the face.

FIG. 4 is a schematic diagram illustrating the inclination of the face. As illustrated in FIG. 4, with respect to the digital camera used for the face recognition, in addition to the face F1 that faces the front, there are faces F2 and F3 turning to the left and to the right, respectively, and there are faces F4 and F5 facing upward and downward, respectively, and the like.

For example, in a case where a user gazes the digital camera provided in the terminal device 1 for face recognition, the image data related to the face F1 is detected from the input image G1 obtained from the digital camera and is output to the recognition processing unit 20. However, if an image is captured when the user is operating the terminal device 1, the orientation of the face is not facing the front but is sometimes inclined as indicated by the faces F2 to F5. In this way, if the orientation of the face is inclined, the image data on the face with inclined orientation (the faces F2 to F5) is output to the recognition processing unit 20.

The recognition processing unit 20 is a processing unit that performs the face recognition by checking the face included in the input image G1 against the previously stored face information. Specifically, the recognition processing unit 20 includes a feature point extracting unit 21, an inter-feature vectors detecting unit 22, a feature angle calculating unit 23, a position calculating unit 24, an individual feature DB 25, and a display processing unit 26.

The feature point extracting unit 21 receives, from the image range detecting unit 12, the image data on the face detected from the input image G1 and identifies and extracts a plurality of feature points that is previously set as the distinctive portions of the face F. Any points may be used for these feature points as long as the subject point is the distinctive portion in the face F and is, specifically, both eyes (for example, pupils), the ear (for example, the ear hole), the nose (for example, the nostril), the mouth (for example, the corners of the mouth), and a mole (lentigo).

The feature point extracting unit 21 analyzes the image data of the face F detected from the input image G1 by using the known technology that uses, in combination, shape recognition, color recognition, and the like, whereby the feature point extracting unit 21 identifies and extracts a plurality of feature points in the image of the face F. The feature point extracting unit 21 outputs, to the inter-feature vectors detecting unit 22 for each extracted feature point, both the information for identifying the feature points (for example, a flag indicating the right eye, the left eye, or the like) and the position in the image (for example, the coordinates of a pixel).

The inter-feature vectors detecting unit 22 detects, based on the plurality of feature points detected by the feature point extracting unit 21, two inter-feature vectors formed by two feature points (a first and a second feature points) that are paired from among the plurality of feature points and the feature point (a third feature point) away from the straight line connecting these two feature points.

Any combination may also be used as a pair of the first and the second feature points as long as the combination of two feature points, such as both eyes, both ears, the left eye and the left nostril, the right eye and the right nostril, and the like, is used. Furthermore, any point may also be used as the third feature point as long as the point, such as the nostril with respect to the both eyes, or the like, that is away from the straight line connecting the first and the second feature points.

The combinations of the first to the third feature points are previously set and the inter-feature vectors detecting unit 22 obtains, from among the plurality of feature points detected by the feature point extracting unit 21, the subject first to the third feature points based on the information used for identifying the feature points. Then, the inter-feature vectors detecting unit 22 detects the two inter-feature vectors that connect between the third feature point and each of the first and the second feature points.

The feature angle calculating unit 23 calculates the feature angle formed by the two inter-feature vectors detected by the inter-feature vectors detecting unit 22. This feature angle is the angle formed by the two inter-feature vectors connecting to the respective first and the second feature points centered on the third feature point.

Figure 5:
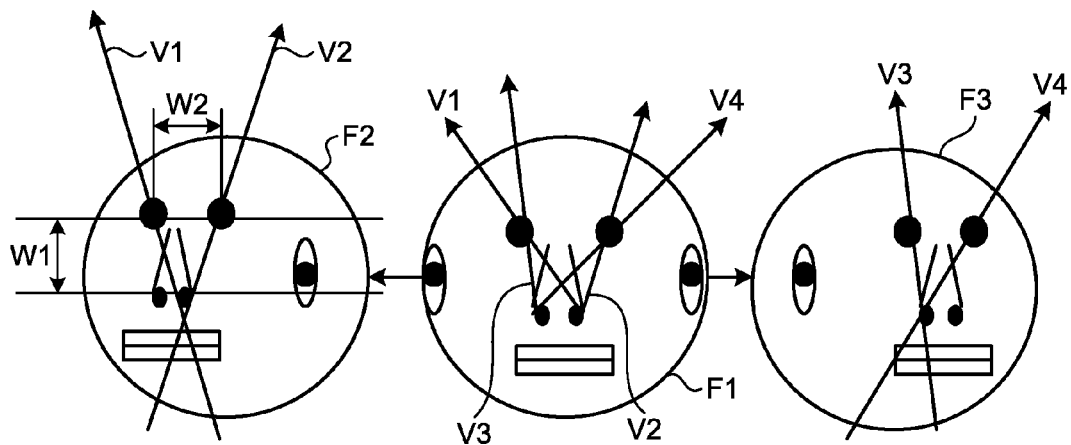
FIG. 5 is a schematic diagram illustrating inter-feature vectors and the feature angles of the inclination of the face facing to the left and the right.

FIG. 5 is a schematic diagram illustrating inter-feature vectors and the feature angles of the inclination of the face facing to the left and the right. As illustrated in FIG. 5, the inter-feature vectors V1 and V2 are vectors passing through both eyes (the first and the second feature points) centered on the left nostril (the third feature point). Similarly, the inter-feature vectors V3 and V4 are vectors passing through both eyes (the first and the second feature points) centered on the right nostril (the third feature point). A distance W1 is the height from the nostril to both eyes and a distance W2 is the width of both eyes.

As is clear from the comparison between the inter-feature vectors V1, V2, V3, and V4 in the faces F1, F2, and F3, if the orientation of the face facing to the left or the right, the positional relationship between both eyes and both nostrils differ depending on the input image G1 that was two-dimensionally captured by the digital camera, i.e., depending on the visual orientation of the face. For example, the visual feature angle formed by the inter-feature vectors V1 and V2 centered on the left nostril is narrower in the face F2 facing to the right than that in the face F1 facing the front. Furthermore, compared with the face F1 facing the front, in the face F2 facing to the right, the distance W1 varies (become narrower); however, the distance W2 does not vary.

Figure 6:
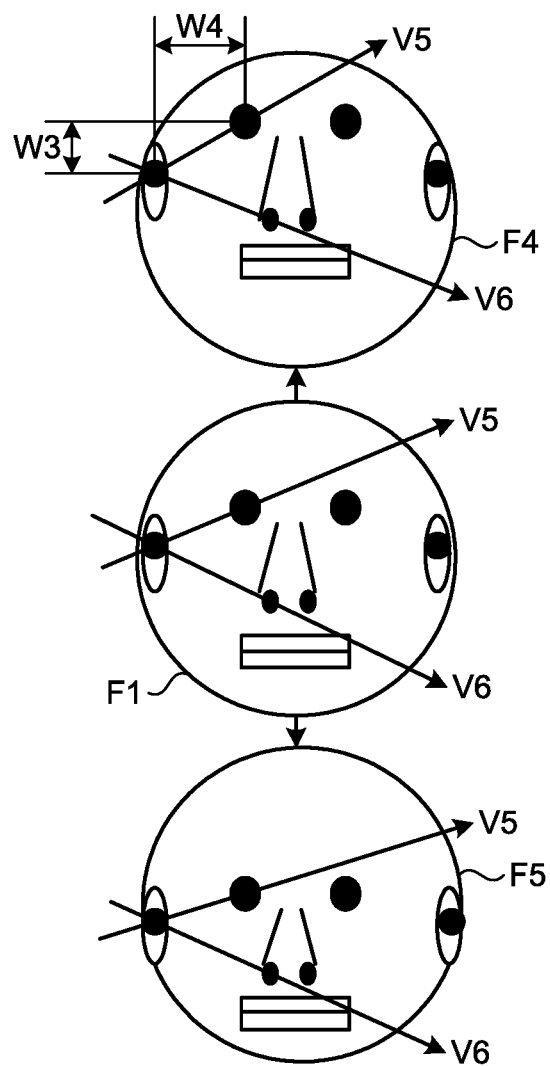
FIG. 6 is a schematic diagram illustrating the inter-feature vectors and the feature angles of the inclination of the face upward and downward.

FIG. 6 is a schematic diagram illustrating the inter-feature vectors and the feature angles of the inclination of the face upward and downward. As illustrated in FIG. 6, inter-feature vectors V5 and V6 are vectors passing through the right eye and the right nostril (the first and the second feature point) centered on the right ear hole (the third feature point). Furthermore, a distance W3 is the height from the right ear hole to the right eye and a distance W4 is the width from the right ear hole to the right eye. As indicated by the inter-feature vectors V1 to V6, any combinations of the first to the third feature points may also be used as long as the first to the third feature points are not aligned on a straight line.

As is clear from the comparison between the inter-feature vectors V5 and V6 in the faces F1, F4, and F5, if the orientation of the face faces upward or downward, the positional relationship between the right ear hole, the right eye, and the right nostril differ depending on the input image G1 that was two-dimensionally captured by the digital camera, i.e., depending on the visual orientation of the face. For example, the visual feature angle formed by the inter-feature vectors V5 and V6 centered on the right ear hole is narrower in the face F5 facing downward than that in the face F1 facing the front. Furthermore, compared with the face F1 facing the front, in the face F5 facing downward, the distance W3 varies; however, the distance W4 does not vary.

Because the positional relationship of the feature points in the face F varies in each person, the positional relationship can be used as information for determination when a person is specified. However, as is clear from the examples illustrated in FIGS. 5 and 6, the positional relationship of the visual feature points varies depending on the orientation of the face. Thus, it is possible to specify a person by defining the third feature point (for example, one of the nostrils) in the face F in the input image G1 as the center and by performing calculation, by considering the orientation of the face, the inter-feature vectors starting from the center to the first and the second feature points (for example, both eyes).

The position calculating unit 24 calculates, based on the two inter-feature vectors detected by the inter-feature vectors detecting unit 22 and the feature angle calculated by the feature angle calculating unit 23, the data related to the positional relationship between the two inter-feature vectors that are used to recognize the subject person. The recognition processing unit 20 performs face recognition by checking the data related to the positional relationship calculated by the position calculating unit 24 against the data related to the positional relationship between the two inter-feature vectors that form the feature angle included in the previously stored face information and verifying the identity. Furthermore, the process of calculating the data related to the positional relationship between the two inter-feature vectors and performing the face recognition will be described in detail later.

The individual feature DB 25 is a database (DB) that stores therein, for each user, the information related to the feature points of the users' face. Specifically, the individual feature DB 25 stores therein, for each ID (for example, the user No., the user ID, etc.) that is used to identify a user, information (face information) on the inter-feature vectors and the feature angles based on feature points in each of the orientations of the faces (facing the front, facing to the right, facing to the left, facing upward, and facing downward).

The display processing unit 26 is a processing unit that displays, on a display or the like, a message or the like related to face recognition, a message or the like related to the setting of the face information serving as the reference of the face recognition. Furthermore, a display on the display performed by the display processing unit 26 will be described in detail later.

The communication unit 30 performs communication with the recognition server 2 and the Web server 3 via the communication network NW. Specifically, the communication unit 30 includes a service connecting unit 31 and an ID management unit 32.

The service connecting unit 31 performs a process of connecting, based on the face recognition performed by the recognition processing unit 20, to the Web service provided by the Web server 3. Specifically, if the subject person, who is a user, has been verified by the face recognition performed by the recognition processing unit 20, the service connecting unit 31 refers to the ID management unit 32 and notifies the recognition server 2 of the permission information including the user ID that is used to identify the verified user. Thus, a connection to the Web service provided by the Web server 3 with respect to the user who has verified as the subject person by the face recognition is permitted by the recognition server 2. After the service connecting unit 31 receives a response indicating permission from the recognition server 2, the service connecting unit 31 performs the connection to the Web service provided by the Web server 3.

The ID management unit 32 manages the information (management data) for each user. Specifically, the ID management unit 32 manages, as management data for each user, the user ID and face information related to each of the orientations of the faces (facing the front, facing to the right, facing to the left, facing upward, facing downward) of the users. Furthermore, the information on the management data in the ID management unit 32 is reflected in the individual feature DB 25.

FIG. 7 is a schematic diagram illustrating ID management. As illustrated in FIG. 7, the ID management unit 32 manages, as management data D1 for each user, the "user No." and the "user ID" for identifying a user, the "password" that has been set by the user, and the face information that is the reference for each of the orientations of the faces of the users. The face information related to each of the orientations of the faces of the users is front data, left surface data, right surface data, upward facing data, downward facing data, or the like and information related to the inter-feature vectors and the feature angles is included for each of the orientations, i.e., facing the front, to the left, to the right, upward, and downward. For example, the front data that indicates the orientation of the user is facing the front includes therein the inter-feature vectors and the feature angle that are formed by the space between both eyes centered on the left nostril, the inter-feature vectors and the feature angle that are formed by the space between both eyes centered on the right nostril, and the like.

The recognition server 2 includes a management DB 40 and a connection information management unit 50. The management DB 40 manages the user ID included in the permission information that is notified by the terminal device 1. The connection information management unit 50 starts, based on the permission information notified by the terminal device 1, a communication connection of the terminal device 1 to the Web service provided by the Web server 3 and manages the connection information related to the started communication connection. Consequently, the terminal device 1 receives the Web service provided by the Web server 3.

Figure 8:
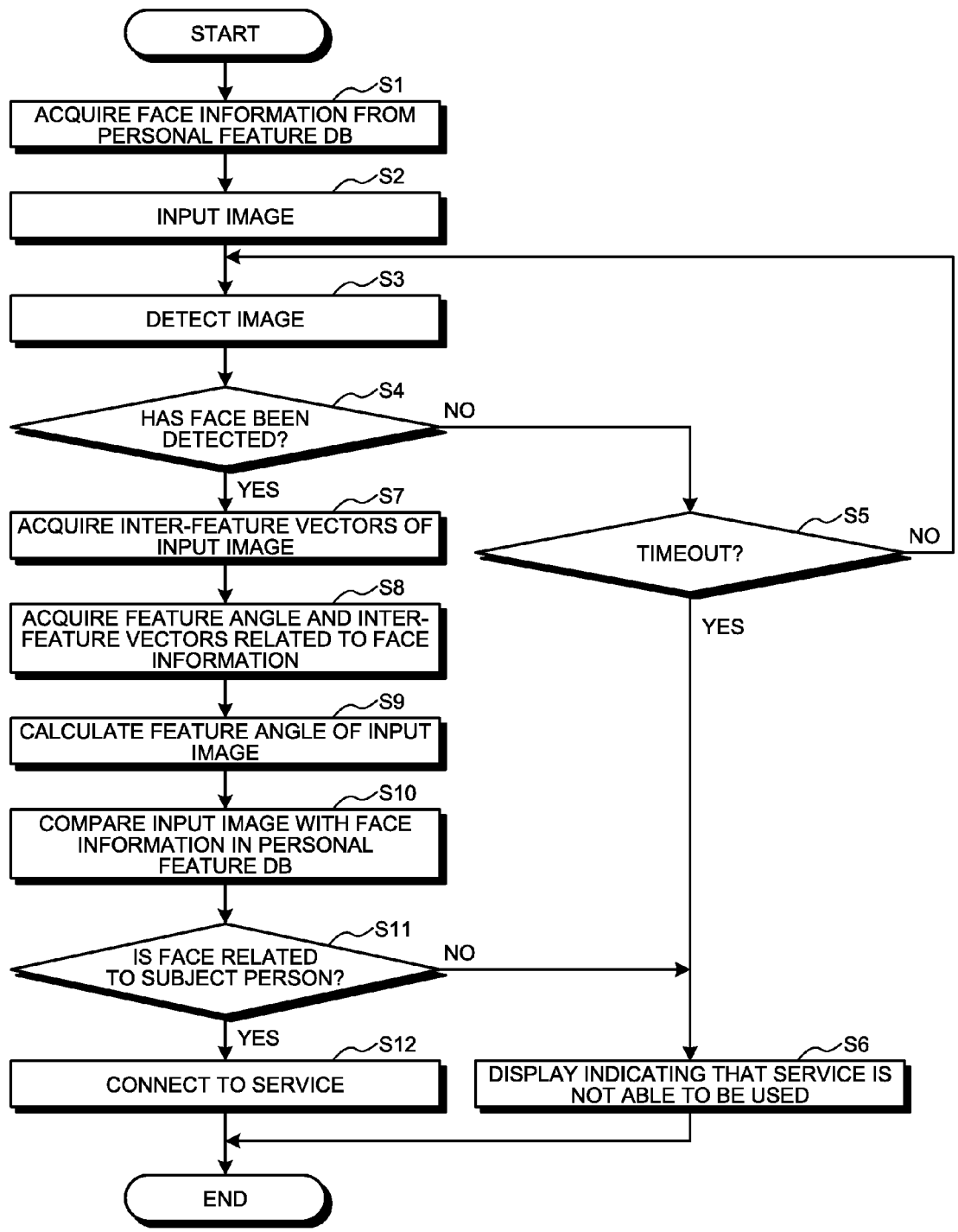
FIG. 8 is a flowchart illustrating an operation example related to face recognition.

In the following, the operation according to the face recognition performed by the video image processing unit 10, the recognition processing unit 20, and the communication unit 30 in the terminal device 1 will be described in detail. FIG. 8 is a flowchart illustrating an operation example related to face recognition. The process indicated by the flowchart is started when, for example, the Web service, the SNS service, or the like is started or when, for example, an application for recognition is started at the time of verification of the subject person while the started service is being continued.

As illustrated in FIG. 8, when a process is started, recognition processing unit 20 acquires, based on the ID of the user that is input by the operating unit 110a (see FIG. 15), or the like by referring to the individual feature DB 25, the face information that is previously set and that is related to the subject person to be recognized (Step S1). The acquisition of the face information is performed only once at the time of the start of the service, such as the Web service, or the like, and the face information may also be stored in a random access memory (RAM) or the like in the terminal device 1. Thus, if the verification of the subject person is performed while the service is being continued, the face image stored in the RAM is acquired.

Then, the video image processing unit 10 receives, by the image input unit 11, the input image G1 captured by the digital camera provided in the terminal device 1 (Step S2). Then, the video image processing unit 10 performs, by the image range detecting unit 12, image detection of the received input image G1 (Step S3) and determines whether the image range of the face has been detected from the image detection performed by the image range detecting unit 12 (Step S4).

The image range of the face was not able to be detected (NO at Step S4), the video image processing unit 10 determines whether the process is set to timeout due to elapse of predetermined period of time since the start of the process (Step S5). If it is determined not to set timeout (NO at Step S5), the video image processing unit 10 returns to Step S3 and continue the process. If it is determined to set timeout (YES at Step S5), the video image processing unit 10 proceeds to Step S6. At Step S6, because the image range of the face is not able to be detected and thus face recognition is not able to be performed, the display processing unit 26 allows the display or the like to display indicating that the service is not able to be used.

If the image range of the face was able to be detected (YES at Step S4), the recognition processing unit 20 extracts, performed by the feature point extracting unit 21, the feature points from the input image G1 and then acquires, performed by the inter-feature vectors detecting unit 22, the inter-feature vectors of the input image G1 (Step S7). Then, the recognition processing unit 20 acquires, from the face information acquired at Step S1, the feature angle and the inter-feature vectors related to the subject face information (Step S8). Then, the recognition processing unit 20 calculates, performed by the feature angle calculating unit 23, the feature angle in the input image G1 (Step S9). Then, the recognition processing unit 20 calculates, performed by the position calculating unit 24, the data related to the positional relationship between the feature angle and the inter-feature vectors in the input image G1 and the feature angle and the inter-feature vectors included in the face information and compares the calculated data (Step S10).

Then, the recognition processing unit 20 determines, based on the comparison performed at Step S10, whether the face is the face that is related to the subject person and that is previously stored in the individual feature DB 25 (Step S11). Specifically, the recognition processing unit 20 determines whether the face is the face that is related to the subject person based on the identity between the positional relationship between the feature angle and the inter-feature vectors in the input image G1 and the positional relationship between the feature angle and the inter-feature vectors related to the face information, i.e., the degree of the similarity between the positional relationships is within a predetermined range.

If the face is related to the subject person (YES Step S11), the recognition processing unit 20 notifies the communication unit 30 that the subject person has been verified by the face recognition. Consequently, the communication unit 30 connects to the Web service provided by the Web server 3 (Step S12). If the face is not related to the subject person (NO at Step S11), the recognition processing unit 20 allows the display processing unit 26 to display, on the display or the like, indicating that the service is not able to be used because the subject person is not able to be verified by the face recognition (Step S6).

In the following, the calculation process performed by the position calculating unit 24 will be described in detail. FIG. 9 is a flowchart illustrating a calculation process.

As illustrated in FIG. 9, when the process is started, the position calculating unit 24 acquires, based on the data acquired at Step S8, the feature angle and the inter-feature vectors that are related to the subject person and that are previously set as the reference (Step S20). Furthermore, the processes described as an example below is a case in which the orientation of the face of the subject person serving as the reference is facing to the front.

Then, the position calculating unit 24 acquires, based on the data acquired at Step S7, the inter-feature vectors from the input image G1 (Step S21). Then, the position calculating unit 24 acquires, from the detection result obtained by the inter-feature vectors detecting unit 22, the center point that is used to obtain the feature angle, i.e., the center point (the third feature point) obtained when the inter-feature vectors have been detected by the inter-feature vectors detecting unit 22 (Step S22).

Then, the feature angle calculating unit 23 calculates the feature angle in the input image G1 based on the feature angle and the inter-feature vectors that are related to the subject person and that are previously set as the reference and based on the inter-feature vectors acquired from the input image G1 (Step S23). Then, based on the inter-feature vectors that are related to the subject person and that are previously set as the reference and based on the inter-feature vectors in the input image G1, the feature angle calculating unit 23 calculates the inclination angle indicating the inclination of the face included in the input image G1 with respect to the orientation of the face (facing to the front) that serves as the reference (Step S24).

Then, the position calculating unit 24 calculates the positional relationship between the inter-feature vectors and the center point in a case where the orientation of the face included in the input image G1 faces the front (Step S25) and calculates the center point and feature angle in a case where the orientation of the face included in the input image G1 faces the front (Steps S26 and S27).

Figure 10A:
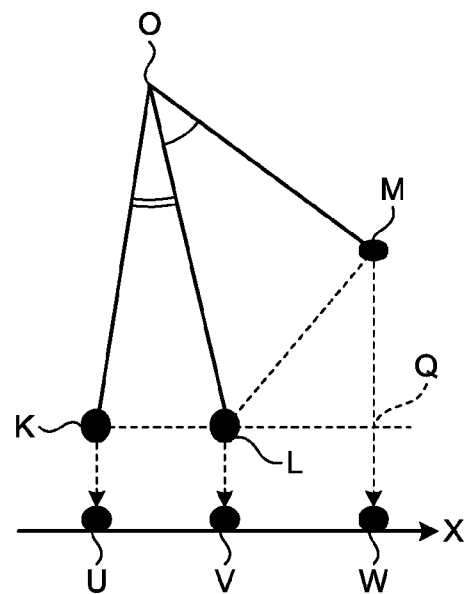
FIG. 10A is a schematic diagram illustrating the positional relationship between feature points of the face facing the front.
Figure 10B:
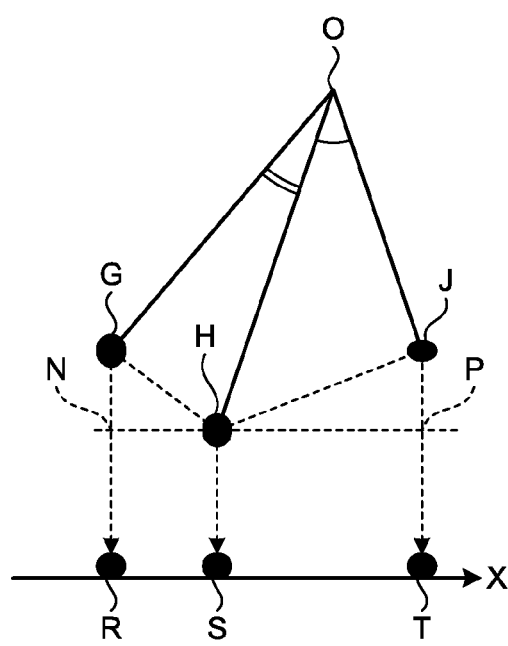
FIG. 10B is a schematic diagram illustrating the positional relationship between feature points of the face facing the left.

In the following, the processes performed at Steps S23 to S27 will be described in detail with reference to FIGS. 10A and 10B. FIG. 10A is a schematic diagram illustrating the positional relationship between feature points (K, L, M) of the face facing the front. FIG. 10B is a schematic diagram illustrating the positional relationship between feature points (G, H, J) of the face facing to the left.

Furthermore, FIGS. 10A and 10B are diagrams illustrating the feature points of the face F are projected onto the Z-X plane from the Y direction illustrated in FIG. 3 and the rotation center in the case where the face F is inclined from the state of facing the front to the state of facing to the left is represented by O. Furthermore, the symbol Q illustrated in FIG. 10A is the intersection of the line obtained by extending the line represented by K-L in the X-axis direction and the line extended from M in the Z-axis direction. Furthermore, the symbols represented by U, V, and W illustrated in FIG. 10A are the points of the symbols represented by K, L, and M on the X-axis and correspond to the pixel positions in the X-axis direction in a case where the feature points K, L, and M are captured from the front by the digital camera. Furthermore, the symbols N and P illustrated in FIG. 10B are the intersection of the line extended from H in the X-axis direction and the lines extended from G and J, respectively, in the Z-axis direction. Furthermore, the symbols represented by R, S, and T illustrated in FIG. 10B are the points of the symbols represented by G, H, and J in the X-axis and correspond to the pixel positions in the X-axis direction in a case where the feature points G, H, and J are captured from the front by the digital camera.

Here, it is assumed that FIG. 10A exemplifies the feature points of the face facing to the front serving as the reference and FIG. 10B exemplifies the feature points of the face facing to the left included in the input image G1. Furthermore, it is assumed that both the feature points (K, L, and M) in the face facing to the front illustrated in FIG. 10A and the feature points (G, H, and J) in the face facing to the left illustrated in FIG. 10B indicate the same feature points. For example, FIG. 10A indicates both eyes (K and L) in the face that is facing to the front and the right ear hole (M) in the face facing to the front. Furthermore, FIG. 10B indicates the both eyes (G, H) in the face facing to the left and the right ear hole (J) in the face facing to the left.

If it is assumed that the face that faces the front and that serves as the reference and the face that faces to the left and that is included in the input image G1 are the face of the same person, because the positional relationships of the feature points are the constant irrespective of the orientation of the face, equations of distance GH=distance KL, distance HJ=distance LM, $\angle$GOH=$\angle$KOL, $\angle$HOJ=$\angle$LOM are satisfied.

In contrast, the magnitude relationships of RS<UV and ST>VW are satisfied between the distance RS and the distance UV, which are the visual distances, and the distance ST and the distance VW. Each of the distances in the magnitude relationships varies in accordance with the inclination of each of the faces; however, the magnitude relationships do not vary.

Here, $\angle$GHN that is the inclination angle of the face facing to the left with respect to the face facing the front is $\angle$GHN=ACOS (NH/GH), where the arccos (arc cosine function) is represented by ACOS. Similarly, $\angle$JHP is $\angle$JHP=ACOS (JP/HJ).

The positions of both eyes and the right ear hole represented by a triangle OKL and a triangle OLM do not vary in any inclination for the same person. Thus, a diagram OKLM and a diagram OGHJ have the congruent shapes. Consequently, $\angle$GHJ=$\angle$KLM is satisfied. If the inclination angle of the right ear hole is represented by $\angle$JHP, 180 degrees−$\angle$GHN−$\angle$KLM=$\angle$JHP is satisfied.

Thus, if it is assumed that the distance GH between the feature points of both eyes in the input image G1 is the subject person, GH=KL is satisfied; therefore, inclination angle$\angle$GHN=ACOS (KL/RS) can be used. Here, KL represents the value (hereinafter, referred to as a save value) that is set as the face information that serves as the individual feature DB 25 and RS represents the detection value detected from the input image G1. At Step S24, the inclination angle is obtained by performing the calculation described above.

When the face having the inclination angle obtained from the calculation faces the front, if the relationship of HJ is the same as that of LM (matches within a predetermined range considering an error), the face can be recognized as the subject person. Namely, if the relationship is satisfied even if the detection value detected from the input image G1 is substituted into the relationship of the save values that are set (saved) as the reference face information, the subject face can be recognized as the subject person.

The equation represented by ∠MLQ=∠GHN+∠JHP is satisfied as long as the face is the subject person. Furthermore, ∠MLQ=ACOS(LM/VW(save value))=ACOS(RS(detection value)/GH(save value))+ACOS(ST(detection value)/HJ)holds . . . (Equation 1 related to the feature angle). The symbols represented by LM and HJ are characteristic values unique to the person and, if LM=HJ, the subject person can be recognized. However, because the recognition is performed based on the detection value, a predetermined error range is set to HJ and, if the same value as that of LM within the error range is obtained, it is assumed that the condition is satisfied.

The symbols represented by LM are the data that is stored in the individual feature DB 25 and that is calculated from the images of the face of the subject person facing the front and the face facing to the left person that serve as the reference. Namely, regarding the subject person, the symbols represented by LM are calculated based on the images obtained from the front and the left surface and stores as the data for obtaining the feature angle in the individual feature DB 25. Here, in the image of the face that is facing to the left and that is related to the subject person serving as the reference, if the symbols associated with G, H, J, R, S, and T illustrated in FIG. 10B are represented by G', H', J', R', S', and T', the following equation is satisfied. ACOS(LM(characteristic value)/VW(save value))=ACOS(R'S'(detection value)/GH(save value))+ACOS(S'T' (detection value)/H'J' (characteristic value))

Because of the image of the subject person, LM=H'J' is satisfied. Thus, LM that is the characteristic value can be calculated from Equation below.

$$ACOS(LM/VW)=ACOS(R'S'/GH)+ACOS(S'T'/LM) \quad \text{(Equation 2 for the feature angle)}$$

In the following, the actual example will be described by using values. In the image facing the front serving as the reference, it is assumed that the center point is the right ear hole, assumed that the distance between the detected left eye and the right ear hole is 43 (pixels), and assumed that the inter-feature vectors are 64 (pixels). Furthermore, in the image of the face facing to the left serving as the reference, it is assumed that the distance between the detected left eye and the right ear hole is 71 (pixels) and assumed that the inter-feature vectors are 53 (pixels). These pieces of information are previously stored in the individual feature DB 25 as the face information that is used to recognize the subject person. Furthermore, the inclination angle of the face facing to the left serving as the reference is assumed to be ACOS (53/64)=34.09 degrees.

The value corresponding to LM illustrated in FIG. 10A is ACOS (43/LM)=ACOS (53/64)+ACOS (71/LM) based on ∠MLQ=∠GHN+∠JHP. Thus, ACOS (43/LM)−ACOS (71/LM)=34.09 is satisfied and LM=about 76.39 is satisfied. Here, ∠MLQ is stored in the individual feature DB 25 as the feature angle that is used to specify the subject person.

Here, it is assumed that the face in which the distance between the left eye and the right ear hole is 65 (pixel) and the inter-feature vector is 60 (pixels) has been detected, from the input image G1, as the face targeted for the face recognition. Assuming that the detected face is related to the subject person, the inclination angle is represented by ∠GHN=ACOS (60/64)=20 degrees and HJ=LM=76.39 is satisfied.

Thus, if values are entered assuming that the allowable range of the error is α<1<β, in (Equation 1 for the feature angle), the following result is obtained.

$$\alpha ACOS(43/76.39) < ACOS(60/64) + ACOS(65/76.39) < \beta ACOS(43/76.39)$$

Here, if α=0.90 and β=1.10 are set, 50.16<20.36+31.69<61.34 is satisfied. Thus, because, even if the detection values detected from the input image G1 is substituted in the relationship of the save values that are set (stored) as the face information serving as the reference, the relationship is satisfied in the allowable range of the error, the subject person can be recognized. Furthermore, in a case where the face is facing to the right, facing upward, facing downward, the recognition is, of course, similarly performed on the subject person.

As described above, the terminal device 1 extracts a plurality of feature points of the face included in the input image G1 and detects the first and the second feature points that are paired from among the plurality of the feature points, the third feature point away from the straight line connecting the first and the second feature points, and the two inter-feature vectors starting from the third feature point to the respective first and the second feature points. Then, the terminal device 1 calculates the feature angle formed by the detected two inter-feature vectors and performs the face recognition based on the feature angle formed by the two inter-feature vectors included in the face information that is previously set in the individual feature DB 25 as the face targeted for the recognition and based on the calculated feature angle. Consequently, in the terminal device 1, it is possible to perform the face recognition even if the face included in the input image G1 is inclined.

More specifically, the face information previously set in the individual feature DB 25 includes therein the two inter-feature vectors in a case where the face with a predetermined orientation and the feature angle formed by the two inter-feature vectors. Then, the feature angle calculating unit 23 calculates, based on the two inter-feature vectors included in the face information and based on the two detected inter-feature vectors, the inclination angle that indicates the inclination of the orientation of the face included in the input image G1 with respect to the orientation of the face that is included in the face information. Then, the recognition processing unit 20 performs the face recognition based on whether the positional relationship of the two detected inter-feature vectors related to the feature angle in a case where the orientation of the face included in the input image G1 is set to the orientation of the face included in the face information matches, based on the calculated inclination angle, the positional relationship in the face information. For example, the face recognition is performed by substituting the save value and the measurement value into Equation 1 for the feature angle related to the positional relationship between the two inter-feature vectors and determining whether the obtained result is within the allowable range of an error. Consequently, even if the face included in the input image G1 is inclined with respect to the reference face facing the front, it is possible to easily perform face recognition.

For example, as the technology that considers, in face recognition, the visual color range based on the orientation of the face, there is a technology that extracts a plurality of pixel areas and the rotation angle with respect to the reference arrangement positions of the face as pixel patterns and that specifies the rotation angle and the orientation of the face by associating the pixel patterns with image feature values for each of the extracted pixel patterns.

Furthermore, there is also a known method that identifies a person based on the space between both eyes due to variation in the luminance values of the distance between the feature points by extracting the mouth and by using the size of the mouth in the lateral direction as the feature points and there is also a known method that detects a target person by using, as the determination reference, the aspect ratio of each of the eyes, the positional relationship between the eyes and the mouth, the levelness of the eyes, or the like, and by extracting these determination references.

With the technologies described above, in order to extracts the constant feature points from the coordinates or the distance between the feature points, it is not possible to obtain accurate values unless a person is positioned at the front of a camera. Furthermore, for example, even if the levelness of the eyes or the like is determined, the determination only grasps the state in which the face is inclined; therefore, it is not possible to determine that the obtained result is the same as the original image that is used to perform recognition and that is stored in a device.

Furthermore, there is also a known technology that uses both eyes as feature portions, that detects the inclination of the straight line connecting the inner canthus, and that corrects the size of an input image by considering the rotation of the face. However, on the straight line that connects the inner canthi, it is possible to perform the correction if the face faces upward or downward; however, if the face faces in the horizontal direction, there is no difference between the inclination of the straight lines in a case where the face faces the front or sideways and thus this technology is not used for the recognition in a case where the face is turned in the lateral direction.

For example, Patent Document 1 described above discloses a method that determines, by searching the brightness and the darkness patterns for a portion corresponding to the eye, whether the color area is a front face image of the person; that detects the positions corresponding to each of the organs included in the front face image from the number of appearances of the color of the skin; that calculates the distance between the organs; and that identifies the person based on the relationship of the distance. However, this method only determines whether the image is the front face image of the person.

Furthermore, because the method of correcting the inclination described in Patent Document 1 is the method that only performs coordinate transformation on images used when creating 3D graphic images in which the images with areas including a plurality of pieces of predetermined color information and an input image are mapped with affine transformation, this method only determines, from the color information based on the brightness and the darkness patterns of the face, whether the image is an inclined image (detection of the inclination). Thus, this method is not used to determine whether the inclined face included in the input image is the subject person. Furthermore, the method that calculates the distance of each of the organs is only the normal image recognition method. Furthermore, even if the face does not face the front but faces to the left, to the right, upward, or downward, the method does not correct the subject inclined image and thus is not able to determine the subject person even in a case of an inclined state.

Furthermore, Patent Document 2 described above discloses a method that extracts feature patterns from the local region, that creates a plurality of pins constituting a feature pattern, and that performs image recognition based on the obtained results. This method can recognize the line of sight of the face by connecting the large number of pins constituting the face; however, all of the pins constituting the face need to be detected as the feature points and the overall configuration for recognizing the inclined face is determined based on the contour edge and the gradient direction of the face. Consequently, the process of creating the pins becomes large and too much load is applied on real time recognition in the SNS service.

In contrast, in the face recognition performed by the terminal device 1 according to the first embodiment, even if the inclination is present in the face included in the input image G1, it is possible to easily perform the face recognition and it is also possible to reduce the load applied to the real time recognition during, for example, the SNS service.

Figure 11:
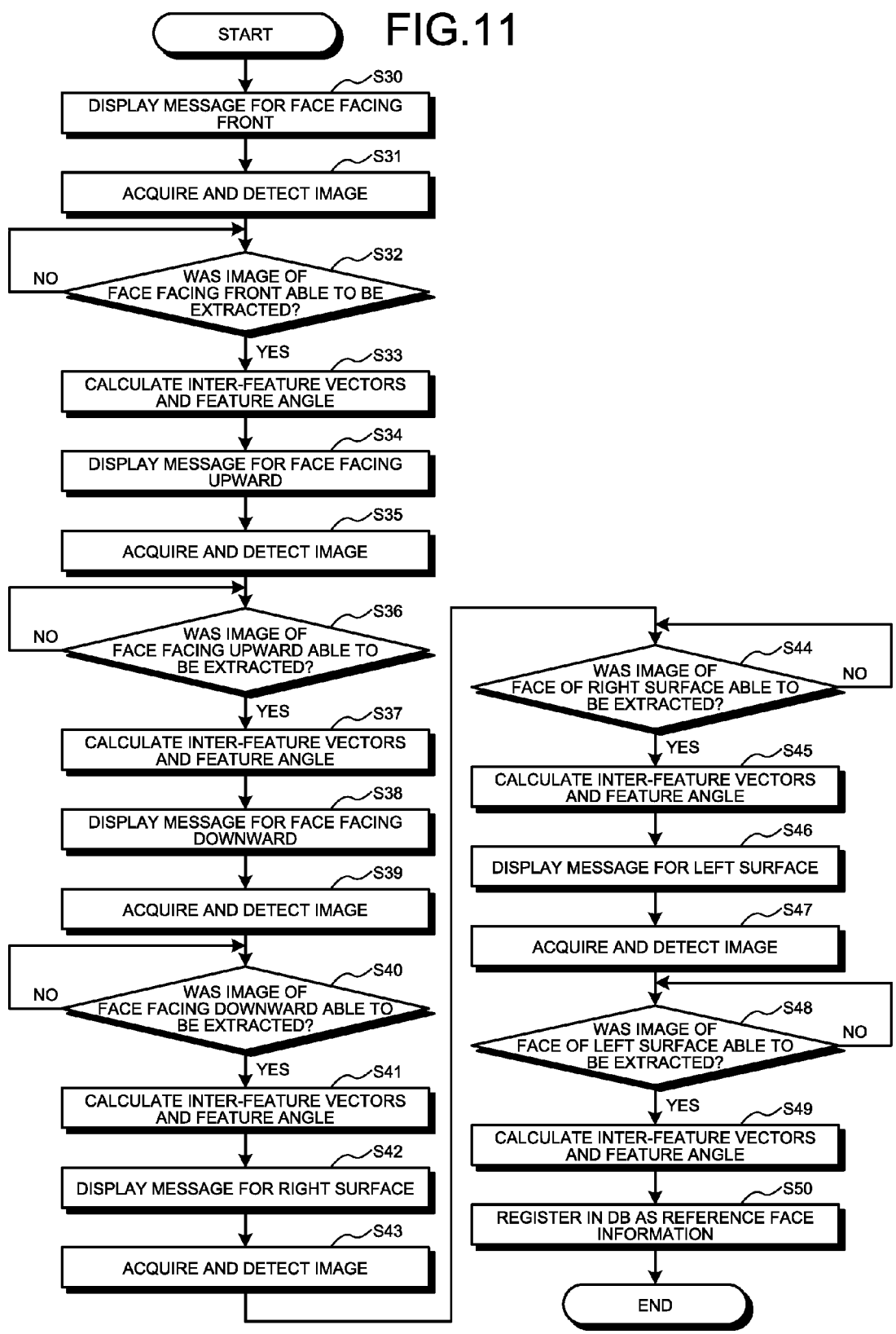
FIG. 11 is a flowchart exemplifying a registration process on reference face information.

In the following, the setting (registration) of the face information serving as the reference of the face recognition will be described in detail. The setting of the face information serving as the reference of the face recognition is one of the processes performed by the recognition processing unit 20 based on the setting operation that is input by an operating unit 110*a* (see FIG. 15) or the like. FIG. 11 is a flowchart exemplifying a registration process on reference face information. The recognition processing unit 20 receives the user ID of a user stored in the management data D1 and the individual feature DB 25 in which the front data, the left surface data, the right surface data, the upward facing data, the downward facing data, and the like are set and starts the registration process.

As illustrated in FIG. 11, if the process is started, the recognition processing unit 20 allows the display processing unit 26 to display, on the display, a message for the front face that instructs to turn the face to the front with respect to the digital camera in the terminal device 1 (Step S30).

Figure 12:
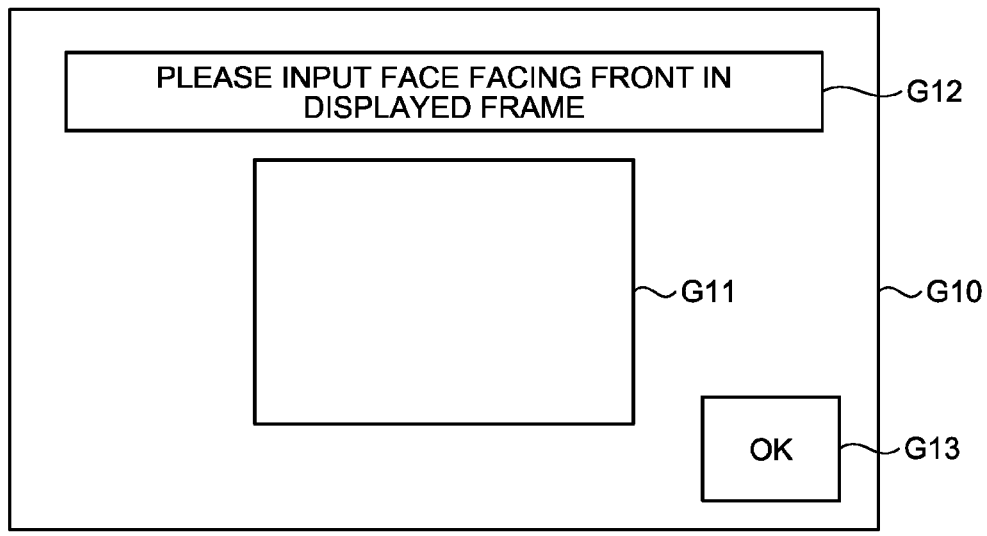
FIG. 12 is a schematic diagram illustrating a display example of a message image.

FIG. 12 is a schematic diagram illustrating a display example of a message G12. As illustrated in FIG. 12, the display processing unit 26 displays, on a display screen G10, an input image G11, a message G12, and an operation button G13. The input image G11 is an image obtained by capturing the subject by the digital camera in the terminal device 1. The user can check the orientation of the own face included in the input image G11 by checking the input image G11. Furthermore, the message G12 has the content indicating that the face is to be faced to the front with respect to the digital camera in the terminal device 1. Consequently, the user can be captured by facing the face to the front with respect to the digital camera in the terminal device 1. The operation button G13 is a button used to instruct acquisition of the face. The user can instruct to capture the face by operating the operation button G13.

Furthermore, the message G12 may also be performed by superimposing the message G12 onto the input image G11. For example, the guidance may also be performed by depicting the position of the eye the nose, the mouth, or the like in a case where the face is facing to the front on the input image G11 as the message G12. In this way, by performing the guidance by superimposing the message G12 onto the input image G11, it is possible to guide to the further accurate orientation of the face.

Then, in response to the acquisition of the image performed by the image input unit 11 and the detection of the face performed by the image range detecting unit 12 (Step S31), the recognition processing unit 20 determines whether the image of the face facing front was able to be extracted (Step S32). The process performed at Step S32 determines, if the face was not able to be detected, by the image range detecting unit 12, in the input image G11 that is acquired by operating the operation button G13 when the message G12 is being displayed, that the image of the face facing the front was not able to be extracted (NO at Step S32) and waits for the process.

If the face has been detected (YES at Step S32), based on the assumption that the image of the face facing the front has been extracted, the recognition processing unit 20 acquires, performed by the inter-feature vectors detecting unit 22, the inter-feature vectors and calculates, performed by the feature angle calculating unit 23, the feature angle (Step S33).

Then, the recognition processing unit 20 allows the display processing unit 26 to display, on the display, a message for the face facing upward that instructs to turn the face upward with respect to the digital camera in the terminal device 1 (Step S34). Then, in response to the acquisition of the image performed by the image input unit 11 and the detection of the face performed by the image range detecting unit 12 (Step S35), the recognition processing unit 20 determines whether the image of the face facing upward was able to be extracted (Step S36). The process at Step S36 determines, if the face was not able to be detected, by the image range detecting unit 12, in the input image G1 that is acquired by operating the operation button G13 when the message G12 for the face facing upward is being displayed, that the upward facing image was not able to be extracted (NO at Step S36) and waits for the process.

If the face was able to be detected (YES Step S36), based on the assumption that the image of the face facing upward can be extracted, the recognition processing unit 20 acquires, performed by the inter-feature vectors detecting unit 22, the inter-feature vectors and calculates, performed by the feature angle calculating unit 23, the feature angle (Step S37).

Then, the recognition processing unit 20 allows the display processing unit 26 to display, on the display, a message for the face facing downward that instructs to turn the face downward with respect to the digital camera in the terminal device 1 (Step S38). Then, in response to the acquisition of the image performed by the image input unit 11 and the detection of the face performed by the image range detecting unit 12 (Step S39), the recognition processing unit 20 determines whether the image of the face facing downward was able to be extracted (Step S40). The process at Step S40 determines, if the face was not able to be detected, by the image range detecting unit 12, in the input image G11 that is acquired by operating the operation button G13 when the message G12 the face facing downward is being displayed, that the downward facing image was not able to be extracted (NO at Step S40) and waits for the process.

If the face was able to be detected (YES at Step S40), based on the assumption that the image of the face facing downward can be extracted, the recognition processing unit 20 acquires, performed by the inter-feature vectors detecting unit 22, the inter-feature vectors and calculates, performed by the feature angle calculating unit 23, the feature angle (Step S41).

Then, the recognition processing unit 20 allows the display processing unit 26 to display, on the display, a message for the right surface that instructs to turn the face to the right with respect to the digital camera in the terminal device 1 (Step S42). Then, in response to the acquisition of the image performed by the image input unit 11 and the detection of the face performed by the image range detecting unit 12 (Step S43), the recognition processing unit 20 determines whether the image of the face of the right surface was able to be extracted (Step S44). The process at Step S44 determines, if the face is not able to be detected, by the image range detecting unit 12, in the input image G11 that is acquired by operating the operation button G13 when the message G12 for the right surface is being displayed, that the image of the face of the right surface was not able to be extracted (NO at Step S44) and waits for the process.

If the face was able to be detected (YES at Step S44), based on the assumption that the image of the face of the right surface was able to be extracted, the recognition processing unit 20 acquires, performed by the inter-feature vectors detecting unit 22, the inter-feature vectors and calculates, performed by the feature angle calculating unit 23, the feature angle (Step S45).

Then, the recognition processing unit 20 allows the display processing unit 26 to display, on the display, a message for the left surface that instructs to turn the face to the left with respect to the digital camera in the terminal device 1 (Step S46). Then, in response to the acquisition of the image performed by the image input unit 11 and the detection of the face performed by the image range detecting unit 12 (Step S47), the recognition processing unit 20 determines whether the image of the face of left surface was able to be extracted (Step S48). The process at Step S48 determines, if the face was not able to be detected, by the image range detecting unit 12, in the input image G11 that is acquired by operating the operation button G13 when the message G12 for the left surface is being displayed, that the image of the face of the left surface was not able to be extracted (NO at Step S48) and waits for the process.

If the face was able to be detected (YES at Step S48), based on the assumption that the image of the face of the left surface was able to be extracted, the recognition processing unit 20 acquires, performed by the inter-feature vectors detecting unit 22, the inter-feature vectors and calculates, performed by the feature angle calculating unit 23, the feature angle (Step S49). Then, the recognition processing unit 20 registers (updates) the inter-feature vectors and the feature angle calculated at Steps S33, S37, S41, S45, and S49 in the management data D1 and the individual feature DB 25 as the reference face information (Step S50). Consequently, it is possible to set, in the management data D1 and the individual feature DB 25 in the terminal device 1, the front data, the left surface data, the right surface data, the upward facing data, the downward facing data, and the like.

[b] Second Embodiment

Figure 13:
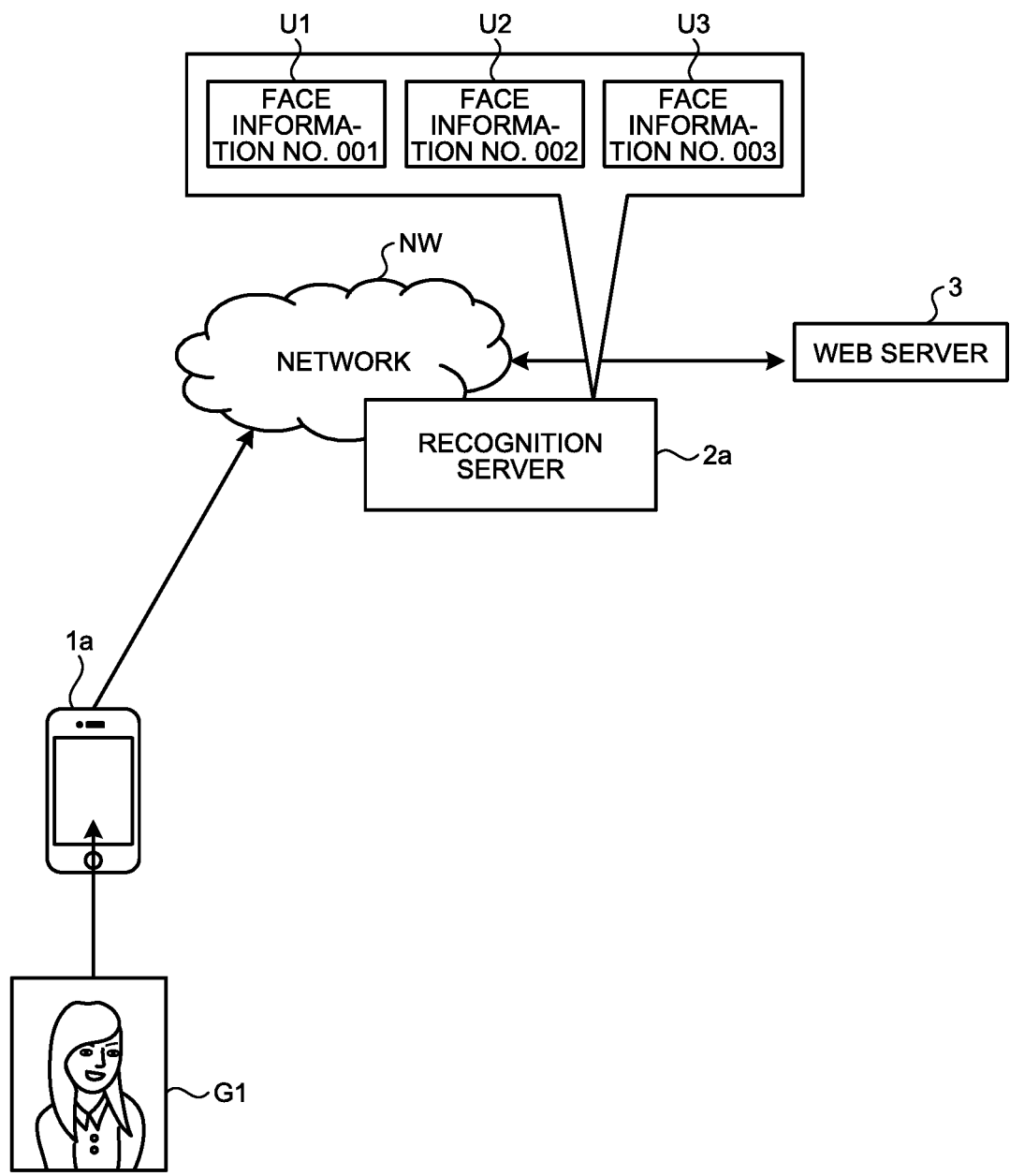
FIG. 13 is a schematic diagram illustrating the system configuration according to a second embodiment.

FIG. 13 is a schematic diagram illustrating the system configuration according to a second embodiment. As illustrated in FIG. 13, the second embodiment differs from the first embodiment in that the input image G1 is sent from a terminal device 1a to a recognition server 2a and the face recognition is performed in the recognition server 2a.

Figure 14:
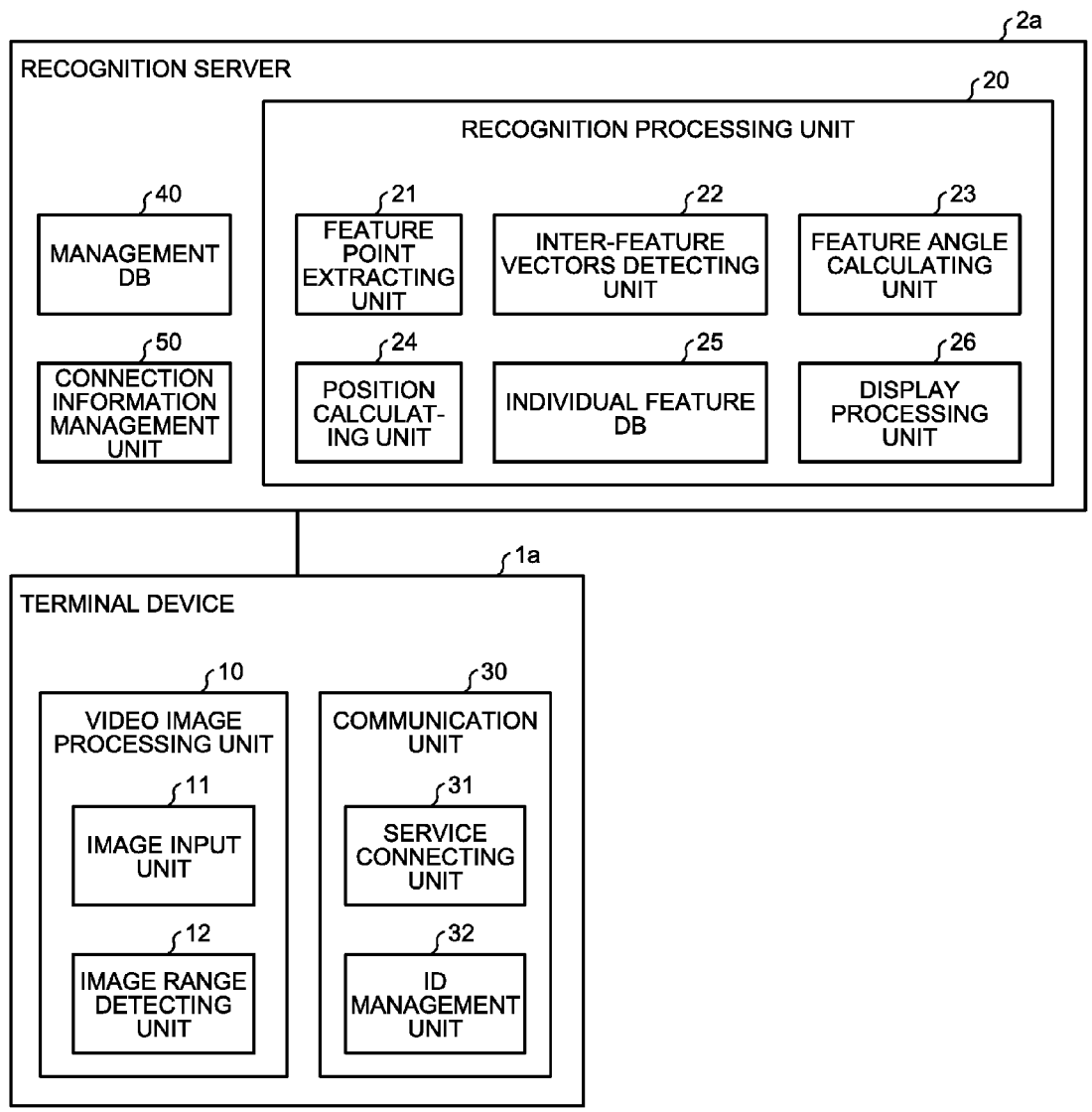
FIG. 14 is a block diagram illustrating a terminal device and a recognition server according to the second embodiment.

FIG. 14 is a block diagram illustrating the terminal device 1a and the recognition server 2a according to the second embodiment. As illustrated in FIG. 14, the second embodiment differs from the first embodiment (see FIG. 2) in that the recognition processing unit 20 is provided in the recognition server 2a.

Specifically, if the terminal device 1a is connected to the Web server 3 due to the face recognition, the terminal device 1a sends the input image G1 obtained by capturing by the digital camera to the recognition server 2a together with the ID of the user. The recognition processing unit 20 in the recognition server 2a reads the face information on the user from the individual feature DB 25 based on the ID of the user sent from the terminal device 1a. Then, the recognition processing unit 20 in the recognition server 2a performs, based on the input image G1 sent from the terminal device 1a, the process on the face recognition that is to be checked against the read face information. If the subject person has been verified by the face recognition, the connection information management unit 50 permits the terminal device 1a to access the Web service provided by the Web server 3 and manages the connection between the Web server 3 provided by the permitted Web service and the terminal device 1a as the connection information. Consequently, the Web service is provided from the Web server 3 to the terminal device 1a.

The various kinds of processes described in the above embodiments may also be implemented by a program prepared in advance and executed by a computer, such as a personal computer or a workstation. Accordingly, in the following, an example of a computer that executes a face recognition program having the same function as that performed in the embodiment described above will be described, as an example, with reference to FIG. 15.

Figure 15:
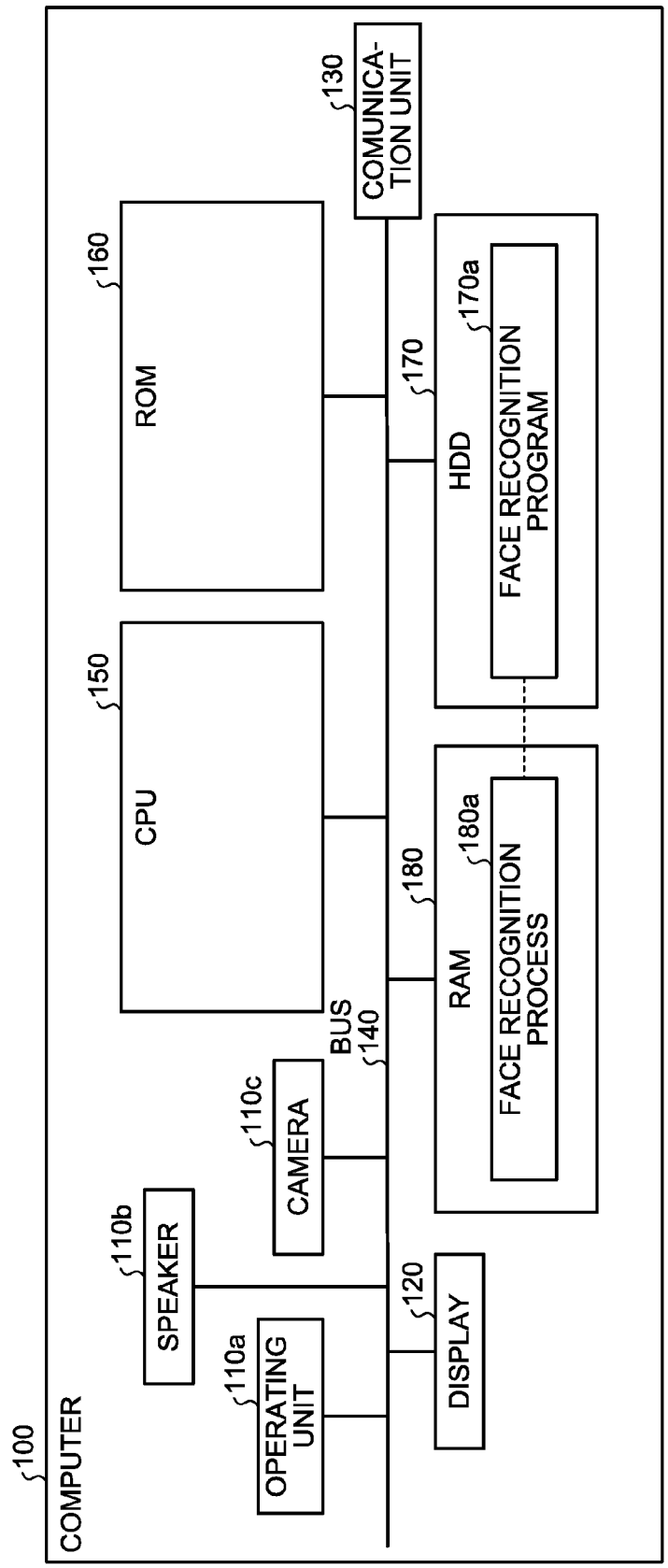
FIG. 15 is a block diagram illustrating an example of a computer that executes a face recognition program.

FIG. 15 is a block diagram illustrating an example of a computer that executes a face recognition program. As illustrated in FIG. 15, a computer 100 includes an operating unit 110a, a speaker 110b, a camera 110c, a display 120, and a communication unit 130. Furthermore, the computer 100 includes a central processing unit (CPU) 150, a read only memory (ROM) 160, a hard disk drive (HDD) 170, and a RAM 180. Each of the units 110 to 180 is connected via a bus 140.

The HDD 170 previously stores therein, as illustrated in FIG. 15, a face recognition program 170a having the same function as that performed by video image processing unit 10, the recognition processing unit 20, and the communication unit 30 described in the first and the second embodiments. Similarly to each of the components in each of the functioning units illustrated in FIG. 2, the face recognition program 170a may also appropriately be integrated or separated. Namely, all the data stored in the HDD 170 does not always have to be stored in the HDD 170 and only a part of data that is used for processes may be stored in the HDD 170.

Then, the CPU 150 reads the face recognition program 170a from the HDD 170 and loads the face recognition program 170a in the RAM 180. Consequently, as illustrated in FIG. 15, the face recognition program 170a functions as a face recognition process 180a. The face recognition process 180a appropriately loads various kinds of data read from the HDD 170 into the allocated area in the RAM 180 and executes various kinds of processes based on the various kinds of loaded data. Furthermore, the face recognition process 180a includes the process performed by the video image processing unit 10, the recognition processing unit 20, and the communication unit 30 illustrated in FIG. 2. Furthermore, regarding each of the processing units virtually implemented in the CPU 150, all the processing units do not always have to be operated in the CPU 150 and only the processing units needed to for processes may be virtually implemented.

Furthermore, the face recognition program 170a does not always need to be initially stored in the HDD 170 or the ROM 160. For example, each program may be stored in a "portable physical medium", such as a flexible disk (FD), a CD-ROM, a DVD disk, a magneto-optic disk, a IC card, or the like that is to be inserted into the computer 100. Then, the computer 100 may acquire and execute the program from the portable physical medium. Furthermore, the face recognition program 170a may be stored in another computer, a server device, or the like that is connected to the computer 100 through a public circuit, the Internet, a LAN, a WAN, or the like and the computer 100 may acquire each of the programs from the other computer or the server device and execute the program.

According to an aspect of the embodiment, it is possible to perform face recognition even if a face is inclined.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A face recognition device for matching a face included in an input image with face information that is previously set with respect to a targeted face targeted for recognition, the face recognition device comprising:
a processor configured to:
extract a plurality of feature points of the face included in the input image;
detect first and second feature points that are paired from among the plurality of the feature points, a third feature point that is away from a straight line that connects the first and the second feature points, and two inter-feature vectors starting from the third feature point to the respective first and the second feature points;
calculate a feature angle formed by the two detected inter-feature vectors;
calculate, based on two inter-feature vectors of the targeted face in a predetermined orientation included in the face information and based on the detected two inter-feature vectors of the face in the input image, an inclination angle that indicates the rotation of the face in the input image about three axes and that is with respect to the orientation of the targeted face associated with the face information; and
perform face recognition based on whether a positional relationship of the two detected inter-feature vectors formed by the calculated feature angle matches a positional relationship of the two inter-feature vectors formed by a feature angle formed by the two inter-feature vectors in the face information, in a case where the orientation of the face in the input image is the orientation of the targeted face associated with the face information, based on the calculated inclination angle.

2. The face recognition device according to claim 1, wherein the processor is further configured to:
display a guide image that guides the orientation of the face included in the input image with respect to a camera to a predetermined orientation; and
acquire an image captured by the camera and set the face information that includes therein the two inter-feature vectors detected from the image and the feature angle calculated from the two detected inter-feature vectors.

3. A face recognition method for matching a face included in an input image with face information that is previously set with respect to a targeted face targeted for recognition, the face recognition method comprising:
extracting a plurality of feature points of the face included in the input image, by a processor;

detecting first and second feature points that are paired from among the plurality of the feature points, a third feature point that is away from a straight line that connects the first and the second feature points, and two inter-feature vectors starting from the third feature point to the respective first and the second feature points, by the processor;

calculating a feature angle formed by the two detected inter-feature vectors, by the processor;

calculating, by the processor based on two inter-feature vectors of the targeted face in a predetermined orientation included in the face information and based on the detected two inter-feature vectors of the face in the input image, an inclination angle that indicates the rotation of the face in the input image about three axes and that is with respect to the orientation of the targeted face associated with the face information; and performing face recognition based on whether a positional relationship of the two detected inter-feature vectors formed by the calculated feature angle matches a positional relationship of the two inter-feature vectors formed by a feature angle formed by the two inter-feature vectors in the face information, in a case where the orientation of the face in the input image is the orientation of the targeted face associated with the face information, based on the calculated inclination angle, by the processor.

4. A non-transitory computer-readable recording medium storing a face recognition program for matching a face included in an input image with face information that is previously set with respect to a targeted face targeted for recognition, the face recognition program causing a computer to execute a process comprising:

extracting a plurality of feature points of the face included in the input image;

detecting first and second feature points that are paired from among the plurality of the feature points, a third feature point that is away from a straight line that connects the first and the second feature points, and two inter-feature vectors starting from the third feature point to the respective first and the second feature points;

calculating a feature angle formed by the two detected inter-feature vectors;

calculating, based on two inter-feature vectors of the targeted face in a predetermined orientation included in the face information and based on the detected two inter-feature vectors of the face in the input image, an inclination angle that indicates the rotation of the face in the input image about three axes and that is with respect to the orientation of the targeted face associated with the face information; and performing face recognition based on whether a positional relationship of the two detected inter-feature vectors formed by the calculated feature angle matches a positional relationship of the two inter-feature vectors formed by a feature angle formed by the two inter-feature vectors in the face information, in a case where the orientation of the face in the input image is the orientation of the targeted face associated with the face information, based on the calculated inclination angle.

* * * * *